Figure 7:
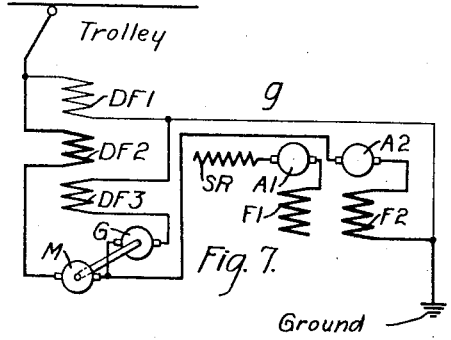
Figure 8:
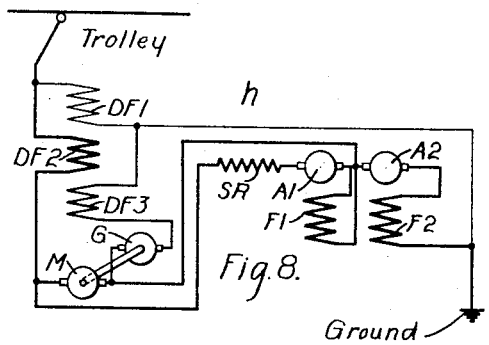

R. E. HELLMUND.
SYSTEM OF CONTROL.
APPLICATION FILED MAR. 7, 1916.
1,311,512.
Patented July 29, 1919.
2 SHEETS—SHEET 1.
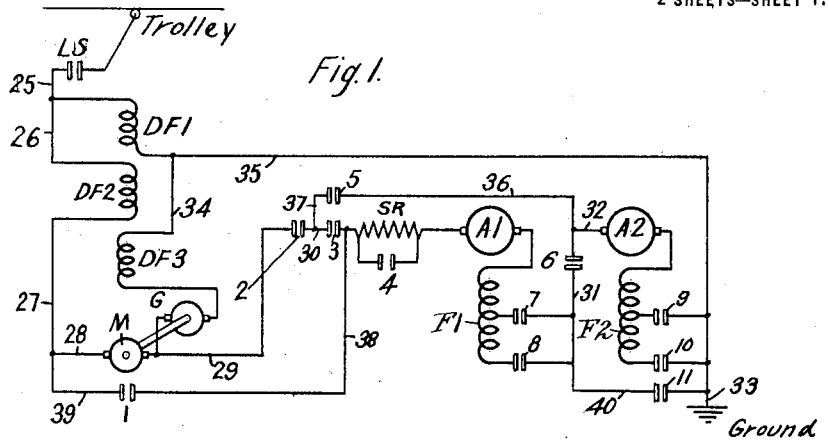
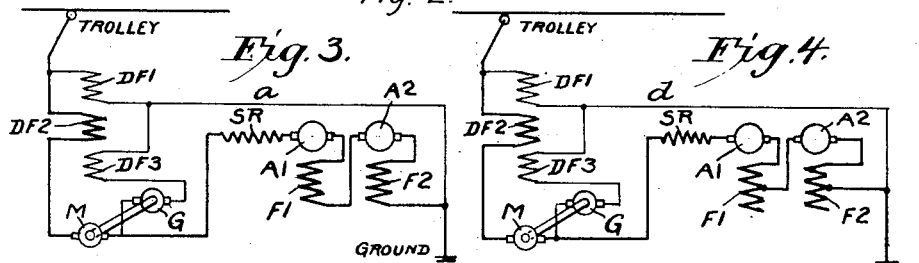
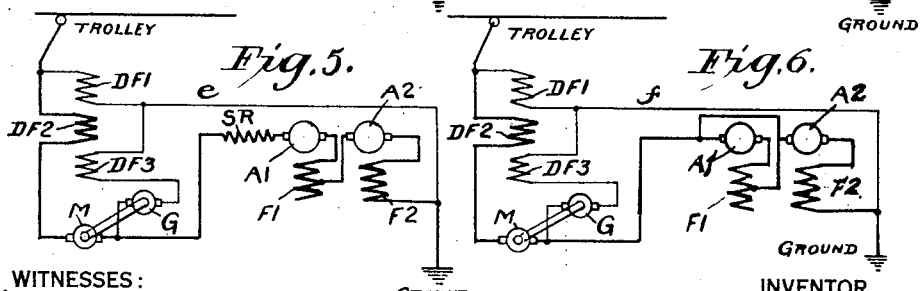
WITNESSES:
Fred H Miller
W. R. Coley
INVENTOR
Rudolf E. Hellmund
BY
Wesley G. Carr
ATTORNEY

R. E. HELLMUND.
SYSTEM OF CONTROL.
APPLICATION FILED MAR. 7, 1916.

1,311,512.

Patented July 29, 1919.
2 SHEETS—SHEET 2.

WITNESSES:
H. B. Funk
W. P. Coley

INVENTOR
Rudolf E. Hellmund.
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,311,512.  Specification of Letters Patent.  Patented July 29, 1919.

Application filed March 7, 1916. Serial No. 82,694.

*To all whom it may concern:*

Be it known that I, RUDOLF E. HELLMUND, a subject of the German Emperor, and a resident of Pittsburgh, in the county of Allegheny and State of Pennsylvania, have invented a new and useful Improvement in Systems of Control, of which the following is a specification.

My invention relates to systems of control for dynamo-electric machines and especially to the control of electric motors of the series type during the accelerating period.

One object of my invention is to provide a relatively simple and reliable system and method of control of the above-indicated character whereby the usual accelerating resistance losses are obviated to a material degree.

More specifically stated, it is the object of my invention to provide, in connection with a plurality of electric driving motors, a plurality of auxiliary armature windings of substantially constant-voltage, preferably comprising a standard dynamotor, and circuit-connections whereby the main motors may be initially connected in series relation with one of the auxiliary armature windings across the supply circuit and for arranging the relations of the driving motors with respect to the auxiliary armature windings in order to effect a gradual increase of voltage upon the main motors until they are connected in parallel relation across the supply circuit, as hereinafter more fully described.

My invention may best be understood by reference to the accompanying drawing, wherein Figure 1 is a diagrammatic view of a system of control embodying my invention; Fig. 2 is a sequence chart of wellknown form for indicating the preferred sequence of operation of the various controlling switches that are shown in Fig. 1, and Fig. 3 to Fig. 14, inclusive, are simplified diagrammatic views of various circuit connections that are employed in the operation of the system.

Referring to the drawing, the system shown comprises a plurality of suitable supply-circuit conductors respectively marked Trolley and Ground; a plurality of main driving motors respectively having armatures A1 and A2 and multi-section field-magnet windings F1 and F2 of the series type; a double-commutator machine, such as the standard dynamotor, having armature windings M and G and a plurality of suitable field-magnet windings DF1, DF2 and DF3, for example; a starting and transition resistor SR; and a plurality of suitable switches LS and 1 to 11, inclusive, for effecting certain circuit connections about to be described. By "standard" dynamotor, I mean the well-known machine wherein two armature windings are disposed on a single rotatable core and are provided with independent commutator cylinders, and a single field-magnet structure is employed in connection with the armature windings.

It is believed that a description of the main circuits in conjunction with the sequence chart of Fig. 2 and the several simplified diagrams will constitute a sufficiently clear and full disclosure of my present invention; and, moreover, inasmuch as the particular type of switches or governing system therefor that is employed is immaterial to my present invention, I have not deemed it necessary to show or describe any such governing system.

Assuming that it is desired to effect acceleration of the main motors, the governing controller (not shown) may be moved to its initial position $a$ to close the switches LS, 2, 3, 6, 8 and 10, whereby a circuit is established from the trolley through switch LS, conductors 25 and 26, field winding DF2 of the dynamotor, conductors 27 and 28, the first armature winding M of the dynamotor, conductor 29, switch 2, conductor 30, switch 3, starting resistor SR, main armature A1, the full field winding F1, switch 8, conductor 31, switch 6, conductor 32, the main armature A2, the full field winding F2, switch 10 and conductor 33 to the negative supply-circuit conductor Ground. The dynamotor armature winding M is thus connected in series relation with the main motors initially; while the second dynamotor armature winding G is connected intermediate the armature M and the field winding DF3 of the dynamotor which is connected through conductors 34 and 35 to the negative conductor 33, or, in other words, the armature winding G is disposed in parallel relation to the main motors. One terminal of the dynamotor field winding DF1 is connected to the positive conductor 25 and the other terminal thereof is connected through conductor 35 to the negative conductor 33. See Fig. 3.

In the next position $b$ of the governing controller (not shown) the switch 4 is closed to short-circuit the resistor SR. Assuming that the dynamotor armature windings M and G are adapted to severally receive approximately one-half of the supply-circuit voltage, it follows that only a relatively small amount of starting resistance is necessary since the several motor armatures, being connected in series relation with the auxiliary armature winding M, do not have to absorb more than substantially one-quarter of the supply-circuit voltage.

In position c, the switches 7 and 9 are closed, while, in position d, the switches 8 and 10 are opened, thus providing the well-known "normal-field" connections to produce a further increase of main-motor speed, in accordance with familiar principles. See Fig. 4.

In position e, corresponding to Fig. 5, the switch 9 is opened and the switch 10 is closed, thereby again providing "full field" on the motor having the armature A2, in readiness for the transition that occurs when the governing controller is moved to position f, whereby the switch 5 is closed, thus connecting the armature A2 through conductors 32 and 36, switch 5 and conductor 37 to conductor 30, or, in other words, directly connecting the armature A2 to the first auxiliary armature winding M and temporarily short-circuiting the other main machine, as shown in Fig. 6.

In position g, the switches 3, 4, 6 and 7 are opened and the switch 8 is closed, as illustrated in Fig. 7, thus disconnecting the armature A1 from the auxiliary armature winding M, opening the short-circuit of the resistor SR, interrupting the series connection between the main machines, and providing the first main machine, having the armature A1, with "full-field" connections, in preparation for the transition of the first main machine, which occurs when the governing controller (not shown) is moved to its position h to close the switches 1 and 6, whereby the armature A1 is connected through resistor SR, conductor 38, switch 1 and conductor 39, to the positively-connected conductor 27. The main machines are thus connected in series relation across the supply circuit, with the resistor SR temporarily in circuit. The first motor is also disposed in parallel relation to the auxiliary armature winding M at this time. See Fig. 8.

Figure 9:
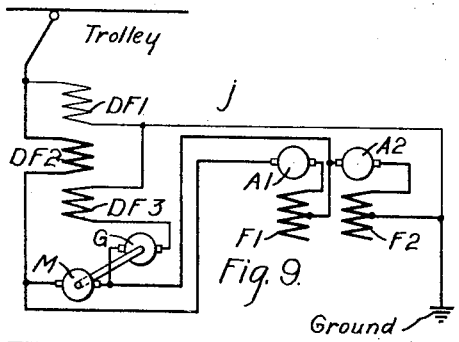
Figure 10:
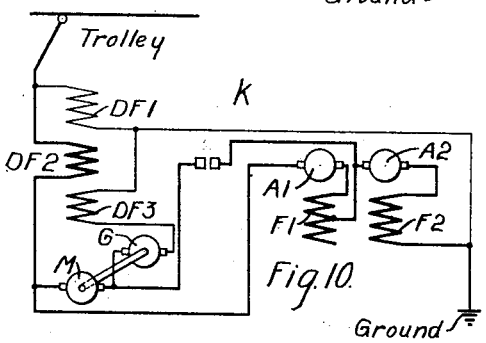
Figure 11:
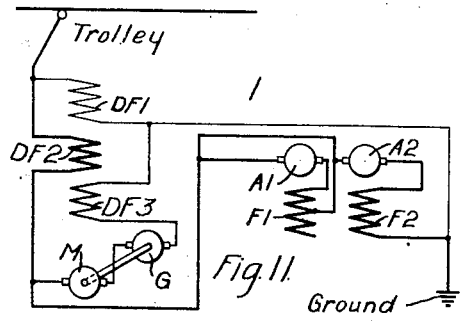
Figure 12:
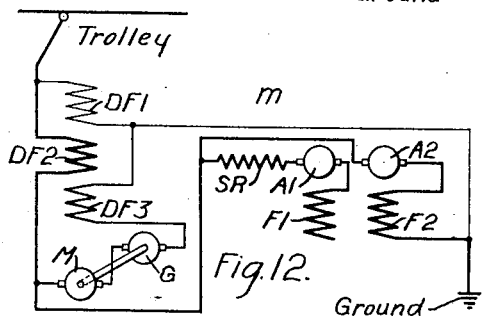
Figure 13:
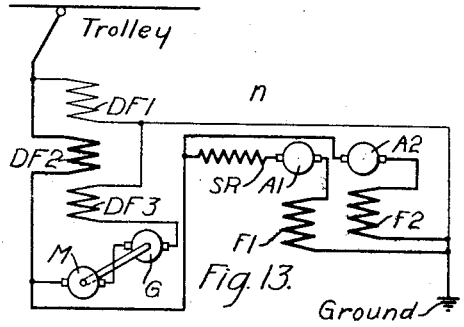

In position i, the switch 4 is closed to again short-circuit the resistor SR, while, in position j, the main field-winding switches are again manipulated as previously described to provide the "normal-field" connections, as shown in Fig. 9.

In position k, switch 9 is opened and switch 10 is closed to again produce "full-field" conditions in the second main dynamo-electric machine, and the switch 2 is opened to disconnect the armature A2 from the auxiliary armature winding M. See Fig. 10.

In position l, the switch 3 is closed, thereby connecting the armature A2 directly across the supply-circuit conductors, since the switches 1, 3, 5 and 10 are simultaneously closed. See Fig. 11.

In position m, the switch 7 is opened and the switch 8 is closed to provide "full-field" connections on the first main dynamo-electric machine, and the switch 6 is opened to interrupt the series connection between the main machines. The short-circuit of the resistor SR is also removed by the opening of switch 4. See Fig. 12.

In position n, the switch 11 is closed, thereby connecting the main field winding F1 through switch 8, conductor 40 and switch 11 to the negative conductor 33, whereby the first main dynamo-electric machine is connected across the supply circuit through the resistor SR. See Fig. 13.

Figure 14:
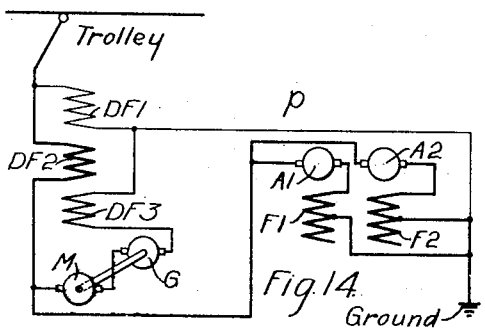

In positions o and p, the resistor SR is short-circuited and "normal-field" connections on the two main motors are then effected. The two motors are thus connected in parallel relation directly across the supply circuit, as shown in Fig. 14. In the sequence chart of Fig. 2, the running positions are denoted by the letter R, and the transition positions by the letter T, for the sake of convenience.

It should be noted that the dynamotor field windings act conjointly to reduce the dynamotor speed at a relatively slow rate while the main machine speed increases. When the initial circuit connection is first made, the dynamotor runs for a short period at a relatively high speed, but, as the main motors gradually start into operation, the auxiliary field windings DF2 and DF3 become energized by the main load current, thus gradually decreasing the dynamotor speed, whereby the stored energy thereof becomes available. This energy is used in assisting to start the main motors, thereby requiring less power actually delivered from the supply circuit at the time of the heaviest drain thereon. In a similar manner, undue current peaks are prevented when taking the various control steps.

It will be seen that I have thus provided a relatively simple, reliable and economical system and method of control for a plurality of main dynamo-electric machines that are employed in conjunction with a plurality of auxiliary machine armature windings, whereby the main machines and the first auxiliary armature winding are initially connected in series relation across the supply circuit, while the second auxiliary armature winding is connected in parallel relation to the main machines, the second main machine being then connected under "full-field"

conditions in series relation with the first auxiliary armature winding, and the following steps comprise open-circuiting the first main machine and then connecting it under "full-field" conditions intermediate the positive supply-circuit conductor and the second motor, disconnecting the second main machine from the first auxiliary armature winding and connecting the main machine, under "full-field" conditions, across the supply circuit, opening the series connection between the main machines and connecting the first main machine under "full-field" conditions also across the supply-circuit.

Some of the advantages and improved results of the above-described system over systems of the prior art may be stated as follows:

(a) Negligible starting losses are insured by the use of a very small single auxiliary machine and a small number of switches.

(b) Elimination of current peaks, in the manner already described and, consequently, good supply-circuit-voltage regulation, slight fluctuation in car lights, etc.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a supply circuit and a plurality of main-dynamo-electric machines severally having an armature and a field winding, of a plurality of auxiliary dynamo-electric machine armature windings respectively initially connected in series relation with, and in parallel relation to, the main machines, means for successively connecting one of said main machines in series relation with the other main machine and with one of said auxiliary armature windings and means for subsequently connecting the machines in series and then in parallel relation across the supply circuit.

2. In a system of control, the combination with a supply circuit and a plurality of motors severally having an armature and a field winding, of a plurality of substantially constant-voltage auxiliary machine armature windings respectively initially connected in series relation with, and in parallel relation to, the initially series-related main motors, means for effecting "normal-field" connections of the motors, means for connecting the second of said motors under "full-field" conditions in series relation with the first auxiliary armature winding, and means for subsequently connecting the motors directly to said supply circuit.

3. In a system of control, the combination with a supply circuit and a plurality of motors severally having an armature and a field winding, of a plurality of substantially constant-voltage auxiliary machine armature windings respectively initially connected in series relation with, and in parallel relation to, the initially series-related main motors, means for effecting "normal-field" connections of the motors, means for connecting the second of said motors under "full-field" conditions in series relation with the first auxiliary armature winding, means for connecting the first motor under "full-field" conditions to one supply-circuit conductor, means for again effecting "normal-field" connections of the motors, and means for successively connecting the second and the first motor under "full-field" conditions across the supply circuit.

4. The method of operating a plurality of main dynamo-electric machines in conjunction with a plurality of auxiliary machine armature windings from a supply circuit that consists in initially connecting the main machines and the first auxiliary armature winding in series relation across the supply circuit and connecting the second auxiliary armature winding in parallel relation to the main machines, connecting the second main machine in series relation with one of said auxiliary armature windings, and subsequently successively connecting the main machines in series and in parallel relation across the supply circuit.

5. The method of accelerating a plurality of motors severally having an armature and a field winding in conjunction with a plurality of auxiliary machine armature windings from a supply circuit that consists in initially connecting the motors and the first auxiliary armature winding in series relation across the supply circuit and connecting the second auxiliary armature winding in parallel relation to the motors, effecting "normal-field" connections of the motors, connecting the second motor under "full-field" conditions in series relation with the first auxiliary armature winding, and subsequently connecting the motors directly to the supply circuit.

6. The method of accelerating a plurality of motors severally having an armature and a field winding in conjunction with a plurality of auxiliary machine armature windings from a supply circuit that consists in initially connecting the motors and the first auxiliary armature winding in series relation across the supply circuit and connecting the second auxiliary armature winding in parallel relation to the motors, effecting "normal-field" connections of the motors, connecting the second motor under "full-field" conditions in series relation with the first auxiliary armature winding, connecting the first motor under "full-field" conditions to one supply-circuit conductor, again effecting "normal-field" connections of the motors, and successively connecting the second and the first motor under "full-field" conditions across the supply circuit.

7. The method of accelerating a plurality of motors severally having an armature and a field winding in conjunction with a plurality of auxiliary substantially constant-voltage machine armature windings from a supply circuit that consists in the following steps; connecting the motors in series relation with the first, and in parallel relation to the second, auxiliary armature winding; connecting the second motor in series relation with the first auxiliary armature winding; open-circuiting the first motor and then connecting it intermediate one supply-circuit conductor and the second motor; disconnecting the second motor from the first auxiliary winding and connecting the motor to one supply-circuit conductor, and opening the series connection between the motors and connecting the first motor to the other supply-circuit conductor.

8. The method of accelerating a plurality of motors severally having an armature and a field winding in conjunction with a resistor and a plurality of auxiliary substantially constant-voltage machine armature windings from a direct-current supply circuit that consists in the following steps: connecting the motors in series relation with the first auxiliary armature winding and the resistor and in parallel relation to the second auxiliary armature winding; short-circuiting the resistor; effecting "normal-field" connections of the motors; connecting the second motor under "full-field" conditions in series relation with the first auxiliary armature winding; open-circuiting the first motor; connecting the first motor under "full-field" conditions and the resistor intermediate the positive supply-circuit conductor and the second motor; again short-circuiting the resistor and effecting "normal-field" connections of the motors; disconnecting the second motor from the first auxiliary armature winding and connecting the motor under "full-field" conditions to the positive supply circuit conductor; opening the series connection between the motors and connecting the first motor under "full-field" conditions and the resistor to the negative supply-circuit conductor; and again short-circuiting the resistor and effecting "normal-field" connections of the motors.

9. The method of effecting acceleration of a plurality of electric motors from a supply circuit in conjunction with a dynamotor having two substantially constant-voltage armature windings, that consists in initially employing one dynamotor armature winding in series relation with the motors and subsequently varying the interconnections of the dynamotor armature windings and the motors to effect predetermined increases of voltage upon said motors until substantially full supply-circuit voltage conditions obtain in each motor.

10. In a system of control, the combination with a supply circuit and a main dynamo-electric machine having an armature and a field winding, of a plurality of dynamotor armature windings respectively initially connected in series relation with, and in parallel relation to, the main machine, means for varying the interconnections of the dynamotor armature windings with said main machine, and a plurality of field windings for said dynamotor armature windings conjointly acting to reduce the dynamotor speed at a relatively slow rate while the main machine speed increases.

11. In a system of control, the combination with a supply circuit and a main dynamo-electric machine having an armature and a field winding, of a plurality of coöperating dynamotor windings respectively initially connected in series relation with, and in parallel relation to, the main machine, means for effecting "normal-field" connection of the main machine, and means for connecting the machine under "full-field" conditions across the supply circuit.

12. The method of operating a main dynamo-electric machine having an armature and a sub-divided field winding in conjunction with a plurality of auxiliary machine armature windings from a supply circuit that consists in initially connecting the auxiliary armature windings respectively in series relation with, and in parallel relation to, the main machine, effecting "normal-field" connection of the main machine, and connecting the machine under "full-field" conditions across the supply circuit.

13. In a system of control, the combination with a supply circuit and a plurality of initially series-related dynamo-electric machines each having an armature and a sub-divided field winding, of means for connecting one machine under "full-field" conditions in parallel relation to the other machine to receive a materially reduced portion of the supply-circuit voltage and for subsequently open-circuiting the other machine and connecting it under "full-field" conditions to receive substantially the full supply-circuit voltage.

14. The method of operating a plurality of dynamo-electric machines each having an armature and a sub-divided field winding from a supply-circuit that includes connecting one machine under "full-field" conditions in parallel relation to the other machine to receive approximately one-half of the supply-circuit voltage, open-circuiting the other machine, and connecting it under "full-field" conditions to receive substantially the full supply-circuit voltage.

15. In a system of control, the combination with a supply-circuit and a dynamo-electric machine having an armature and a sub-divided field winding, of means for connecting said machine during operation at a certain voltage under "normal-field" conditions to receive substantially double that voltage under "full-field" conditions, and means other than said supply circuit for providing the lower voltage.

16. In a system of control, the combination with a supply circuit and a dynamo-electric machine having an armature and a sub-divided field winding, of means for connecting said machine during operation at a certain voltage under "normal-field" conditions to receive substantially double that voltage under "full-field" conditions, and auxiliary dynamo-electric means for providing the lower voltage.

17. In a system of control, the combination with a supply circuit and a dynamo-electric machine having an armature and a sub-divided field-winding, of means not including a transitional resistor for directly connecting said machine during operation at a certain voltage under "normal-field" conditions to receive substantially double that voltage under "full-field" conditions.

In testimony whereof, I have hereunto subscribed my name this 28th day of Feb. 1916.

RUDOLF E. HELLMUND.

Copies of this patent may be obtained for five cents each, by addressing the "Commissioner of Patents, Washington, D. C."